3,107,263
ANTHRANILIC ACIDS
Robert A. Scherrer, Ann Arbor, Mich., assignor to Parke, Davis & Company, Detroit, Mich., a corporation of Michigan
No Drawing. Filed Jan. 12, 1961, Ser. No. 82,169
6 Claims. (Cl. 260—518)

This invention relates to novel anthranilic acids and to methods for producing the same. More particularly, the invention relates to anthranilic acids and slats thereof which in their free acid form have the formula,

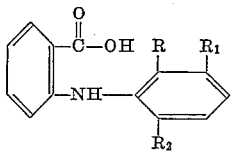

where R is halogen or a methyl group, $R_1$ is hydrogen, halogen or a nitro group and $R_2$ is hydrogen, halogen, a methyl group or a nitro group, one of said $R_1$ and $R_2$ being a nitro group.

In accordance with the invention, anthranilic acids of the above formula and their salts are produced by condensing a benzoic acid derivative of formula

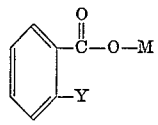

with a compound of formula

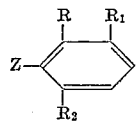

where R, $R_1$ and $R_2$ have the same significance as given above, M represents hydrogen or an alkali metal, preferably potassium; Y represents —$NH_2$ or halogen; and Z represents —$NH_2$ or halogen, Y being halogen when Z is —$NH_2$ and Z being halogen when Y is —$NH_2$. Bromine is the preferred halogen substituent. The reaction is preferably carried out in a solvent and in the presence of a copper-containing catalyst and a proton acceptor. Some of the solvents which can be used are N,N-dimethylformamide, bis(2-methoxyethyl)ether, dimethyl sulfoxide, nitrobenzene, and lower aliphatic alcohols such as n-butanol, isoamyl alcohol and the like. Preferred solvents are N,N-dimethylformamide, and bis(2-methoxyethyl)ether. In general, the reaction is favored by temperatures in excess of 75° C. and is preferably carried out at a temperature between 100° C. and 200° C. Substantially equivalent quantities of the two reactants are usually used.

Some examples of the copper-containing catalysts which can be used in carrying out the process are various forms of mechanically divided or chemically precipitated metallic copper such as e.g. powdered copper or spongy copper and various copper-containing compounds such as cuprous bromide, cuprous chloride, cupric acetate, cupric carbonate, cupric oxide, cupric sulfate and the like. Cupric bromide and cupric acetate are the preferred catalysts.

The quantity of the proton acceptor employed in the reaction can be varied within wide limits. In general, sufficient should be used to bind the benzoic acid reactant and the hydrohalic acid formed in the course of the reaction. Some of the proton acceptors which can be used when the benzoic acid derivative is employed in free acid form are alkali metal carbonates, preferably potassium carbonate; cupric carbonate; cuprous carbonate and the like. When an alkali metal salt, preferably the potassium salt of the benzoic acid reactant is employed, the following substances can be used as the proton acceptor: calcium hydride, alkali metal carbonates such as e.g. potassium carbonate and tertiary organic amines such as N-ethylmorpholine.

The benzoic acid reactant is advantageously added to the reaction mixture in the form of its preformed alkali metal salt, preferably the potassium salt. Alternatively, the potassium salt of the benzoic acid reactant can be conveniently prepared in situ in a very finely divided condition by adding potassium carbonate to a boiling solution of the free acid form of the corresponding benzoic acid derivative in the solvent employed in the reaction. In the latter case, it is often advantageous to remove most of the water formed in the neutralization by distilling some of the solvent prior to the addition of the catalyst and other reactant.

The compounds of the invention possess a high degree of anti-inflammatory activity and hence are of value in mitigating the symptoms associated with rheumatic, arthritic and other inflammatory conditions. They are preferably administered by the oral route. Either the free acids or pharmaceutically-acceptable carboxylate salts with a variety of pharmaceutically-acceptable inorganic and organic bases can be used, the term "pharmaceutically-acceptable base" designating a base capable of being employed in the production of salts suitable for pharmaceutical use even though, like caustic bases and some organic amines, it is not acceptable for pharmaceutical use in and of itself. The expression "salts with pharmaceutically-acceptable bases" refers to chemical structure rather than to method of formation, and includes such salts whether formed by neutralization or other salt forming means. Some typical examples of such salts are the sodium, potassium, calcium, ammonium, choline, 2-hydroxyethylamine, bis(2-hydroxyethyl)amine, tris(2-hydroxyethyl)amine and like salts. Preferred salts are the pharmaceutically-acceptable salts of an alkali metal, an alkaline earth metal, ammonia or a substituted ammonia. The salts or free acids of the invention can be combined with either a solid or liquid carrier or diluent and made available in varying amounts in such conventional vehicles as tablets, capsules, powders, dragees, suspensions and solutions.

The invention is illustrated by the following examples.

*Example 1*

A mixture of 65.5 g. potassium o-bromobenzoate, 27.8 g. 3-nitro-2-methylaniline, 23 ml. N-ethylmorpholine and 4 g. cupric bromide in 100 ml. diglyme is heated at 130–150° for one hour. The hot reaction mixture is acidified with concentrated hydrochloric acid and filtered while hot (vacuum) to remove the morpholine hydrochloride. The filtrate is carefully diluted with an equal volume of water to give a brick-red granular solid. The solid is filtered, dissolved in dilute sodium hydroxide, any insolubles filtered and the solution acidified with acetic acid. The precipitated N-(2-methyl-3-nitrophenyl) anthranilic acid is filtered, dissolved in 450 ml. absolute ethanol, treated with decolorizing carbon, filtered, and left at room temperature overnight. The crystalline N-(2-methyl-3-nitrophenyl)-anthranilic acid thereby obtained is filtered and further recrystallized from isopropanol; M.P. 217–221° C. (dec.).

A suspension of 20.0 g. N-(2-methyl-3-nitrophenyl)-anthranilic acid in 300 ml. methanol is treated portionwise with 10.0 g. sodium carbonate and the mixture heated on a steam bath for ten minutes. The excess solid sodium carbonate is removed by filtration and the filtrate evaporated to dryness, leaving as a residue the sodium salt of N-(2-methyl-3-nitrophenyl)-anthranilic acid.

If potassium carbonate is used in place of sodium carbonate in the above salt formation, the potassium salt of N-(2-methyl-3-nitrophenyl)-anthranilic acid is obtained.

A mixture of 2.65 g. of choline chloride and 5 g. of the sodium salt of N-(2-methyl-3-nitrophenyl)-anthranilic acid in ethanol is heated to about 70° C. for 5 to 10 minutes. The sodium chloride which forms in the course of the reaction is removed by filtration and the filtrate concentrated in vacuo to give a clear oily residue from which the N-(2-methyl-3-nitrophenyl)-anthranilic acid choline salt crystallizes on standing.

*Example 2*

A mixture of 70.0 g. potassium o-bromobenzoate, 26.2 g. 3-chloro-2-methyl-6-nitroaniline, 3.25 g. calcium hydride in 75 ml. diglyme is placed in a reaction vessel, the vessel flushed with nitrogen and heated to 60° C. Cupric bromide (2.0 g.) is added and the mixture heated at 70–160° for one hour. The hot reaction mixture is transferred to an Erlenmeyer flask and diluted with 100 ml. diglyme (used to rinse the original reaction vessel). Water (3 ml.) is added followed by excess concentrated hydrochloric acid. The reaction mixture is then diluted with an equal amount of water and allowed to stand overnight. The oily precipitate which has settled out of the solution is filtered and washed with a 50% aqueous methanol solution. A sufficient quantity of 0.67 N sodium hydroxide is added to the solid to make a basic solution. The solid which does not dissolve in the basic solution is filtered and represents unreacted 3-chloro-2-methyl-6-nitroaniline. The basic solution is acidified with acetic acid and the precipitated N-(3-chloro-2-methyl-6-nitrophenyl)-anthranilic acid is filtered, redissolved in 300 ml. ethanol, treated with decolorizing carbon, the carbon filtered, the solution concentrated, and allowed to stand in the refrigerator for 48 hours. The deposited bright orange-yellow N - (3-chloro-2-methyl-6-nitrophenyl)-anthranilic acid is filtered, dried, and has M.P. 248–249° C.; M.P. 254–5° C. after recrystallization from ethanol.

A suspension of 20.0 g. N-(3-chloro-2-methyl-6-nitrophenyl)-anthranilic acid in 300 ml. methanol is treated portionwise with 10.0 g. sodium carbonate and the mixture heated on a steam bath for ten minutes. The excess solid sodium carbonate is removed by filtration and the filtrate evaporated to dryness, leaving as a residue the sodium salt of N-(3-chloro-2-methyl-6-nitrophenyl)-anthranilic acid.

If potassium carbonate is used in place of sodium carbonate in the above salt formation, the potassium salt of N-(3-chloro-2-methyl-6-nitrophenyl)-anthranilic acid is obtained.

*Example 3*

A mixture of 65.5 g. potassium o-bromobenzoate, 30.2 g. 2,6-dimethyl-3-nitroaniline, 23 ml. N-ethylmorpholine and 4 g. cupric bromide in 100 ml. diglyme is heated at 130–150° for one hour. The reaction mixture is acidified with concentrated hydrochloric acid and filtered while hot (vacuum) to remove the morpholine hydrochloride. The filtrate is carefully diluted with an equal volume of water and the solid which precipitates is filtered. The solid is added to sufficient dilute sodium hydroxide to maintain a basic solution, any insolubles are filtered, and the solution is acidified with acetic acid. The precipitated N-(2,6-dimethyl-3-nitrophenyl)-anthranilic acid is filtered, dissolved in ethanol, treated with decolorizing carbon, filtered and the solvent removed in vacuo. The residue of N-(2,6-dimethyl-3-nitrophenyl)-anthranilic acid is recrystallized from isopropanol; M.P. 229–230° C.

*Example 4*

A mixture of 19.2 g. 2,3-dichloronitrobenzene, 26.3 g. potassium o-aminobenzoate, and 2.52 g. calcium hydride in 50 ml. dimethylformamide is placed in a 300 ml. round bottom flask, the flask flushed with nitrogen, heated to 150° C. and then 1.5 g. cupric acetate added. The reaction mixture is heated at 150–175° C. for 2 hours and then allowed to stand overnight at room temperature. Sufficient water is added to decompose any unused calcium hydride and the solution is acidified with concentrated hydrochloric acid and a precipitate forms. Aqueous sodium hydroxide is added to make the solution basic, the insolubles are filtered, and the basic solution extracted with two 100 ml. portions ether. The basic solution is then treated with decolorizing carbon, filtered, and acidified. The precipitated N-(2-chloro-6-nitrophenyl)-anthranilic acid is filtered and recrystallized several times from ethanol and then from ethyl acetate/petroleum ether; M.P. 219–220° C. (dec.).

A suspension of 20.0 g. N-(2-chloro-6-nitrophenyl)-anthranilic acid in 300 ml. methanol is treated portionwise with 10.0 g. sodium carbonate and the mixture heated on a steam bath for ten minutes. The excess solid sodium carbonate is removed by filtration and the filtrate evaporated to dryness, leaving a residue of the sodium salt of N-(2-chloro-6-nitrophenyl)-anthranilic acid.

If potassium carbonate is used in place of sodium carbonate in the above salt formation, the potassium salt of N-(2-chloro-6-nitrophenyl)-anthranilic acid is obtained.

2.65 g. of choline chloride dissolved in ethanol is added to an ethanolic solution of 5 g. of the sodium salt of N-(2-chloro-6-nitrophenyl)-anthranilic acid. The mixture is heated to about 70° C. for 5 to 10 minutes. The sodium chloride which forms in the course of the reaction is removed by filtration and the filtrate concentrated in vacuo to give a clear oily residue from which the N-(2-chloro-6-nitrophenyl)-anthranilic acid choline salt crystallizes on standing.

*Example 5*

A mixture of 10.8 g. 2,3,4-trichloronitrobenzene, 12.6 g. potassium o-aminobenzoate, and 1.26 g. calcium hydride in 30 ml. of dimethylformamide is placed in a 200 ml. round bottom flask, the flask flushed with nitrogen, heated to 120° C. and then 1.0 g. cupric acetate added. The reaction mixture is heated at 120–145° C. for thirty-five minutes and then allowed to stand at room temperature overnight. Sufficient water is added to decompose any unused calcium hydride and the solution is then acidified with concentrated hydrochloric acid. Aqueous sodium hydroxide is added to make the solution basic, the insolubles are filtered and the basic solution extracted with two 100 ml. portions ether. The basic solution is then treated with decolorizing carbon, filtered, and acidified. The precipitated N-(2,3-dichloro-6-nitrophenyl)-anthranilic acid is filtered and recrystallized from ethyl acetate/petroleum ether; M.P. 217–222° C. (dec.).

I claim:

1. A compound of the class consisting of a free acid and salts thereof with pharmaceutically-acceptable bases, said free acid having the formula,

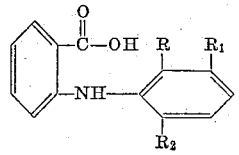

where R is a member of the class consisting of chlorine and methyl, $R_1$ is a member of the class consisting of hydrogen, chlorine and nitro and $R_2$ is a member of the class consisting of hydrogen, chlorine, methyl, and nitro, one of said $R_1$ and $R_2$ being nitro.

2. N-(2-methyl-3-nitrophenyl)-anthranilic acid.
3. N-(2-methyl-3-chloro-6-nitrophenyl)-anthranilic acid.
4. N-(2-chloro-6-nitrophenyl)-anthranilic acid.
5. N-(2,3-dichloro-6-nitrophenyl)-anthranilic acid.
6. N-(2,6-dimethyl-3-nitrophenyl)-anthranilic acid.

References Cited in the file of this patent

Nisbet et al.: Chemical Abstracts, vol. 27, p. 509 (1933). (Copy in Library.)

Migridichian: Organic Synthesis, vol. II, p. 1428 (1957). (Copy in Div. 38.)